US012691688B2

(12) United States Patent
Otana

(10) Patent No.: US 12,691,688 B2
(45) Date of Patent: Jul. 28, 2026

(54) INKJET RECORDING APPARATUS

(71) Applicant: KYOCERA Document Solutions Inc., Osaka (JP)

(72) Inventor: Aiichiro Otana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 132 days.

(21) Appl. No.: 18/762,059

(22) Filed: Jul. 2, 2024

(65) Prior Publication Data

US 2025/0010618 A1 Jan. 9, 2025

(30) Foreign Application Priority Data

Jul. 6, 2023 (JP) ................................ 2023-111358

(51) Int. Cl.
*B41J 2/17* (2006.01)

(52) U.S. Cl.
CPC ........... *B41J 2/1721* (2013.01); *B41J 2/1714* (2013.01)

(58) Field of Classification Search
CPC .............................. B41J 2/1721; B41J 2/1714
See application file for complete search history.

(56) References Cited

U.S. PATENT DOCUMENTS

2024/0131847 A1* 4/2024 Otana .................... B41J 11/007

FOREIGN PATENT DOCUMENTS

EP 1162072 A1 * 12/2001 .......... B41J 2/16508
JP H 06-340092 A 12/1994

* cited by examiner

*Primary Examiner* — Ricardo I Magallanes
*Assistant Examiner* — Natasha Dephenia Quinn
(74) *Attorney, Agent, or Firm* — Stein IP LLC

(57) ABSTRACT

A bellows section of a suction air passage includes a first portion, a second portion located on one side in a first direction with respect to the first portion, and a third portion located on one side in a second direction with respect to the first portion and the second portion. A partitioning member includes a first partitioning section defining the first portion on the one side in the second direction, a second partitioning section defining the second portion on the one side in the second direction, and a third partitioning section defining the third portion on the other side in the second direction. The first partitioning section, the second partitioning section, and the third partitioning section overlap each other in the first direction.

2 Claims, 12 Drawing Sheets

INKJET RECORDING APPARATUS

INCORPORATION BY REFERENCE

This application is based on and claims the benefit of priority from Japanese Patent Application No. 2023-111358 filed on Jul. 6, 2023, the contents of which are hereby incorporated by reference.

BACKGROUND

The present disclosure relates to an inkjet recording apparatus.

A conventional inkjet recording apparatus is mounted with a waste ink container to store ink to be disposed of. The waste ink container is connected to a suction mechanism. The suction mechanism sucks gas from the waste ink container. The gas sucked by the suction mechanism flows through an air passage formed inside the waste ink container. The gas contains ink in a mist form.

SUMMARY

An inkjet recording apparatus of the present disclosure comprises a recording head, a waste ink container, and a suction mechanism. The recording head records an image by discharging ink to a recording medium being conveyed. The waste ink container is located in such a manner as to face the recording head in a certain direction across a conveyance path of the recording medium, has a reservoir region therein, and stores the ink in the reservoir region. The stored ink is discharged from the recording head and not to be used for recording of the image. The suction mechanism sucks gas from the waste ink container. The waste ink container has a receiving opening, a suction opening, a suction air passage, and a partitioning member. The receiving opening receives the ink discharged from the recording head. The suction opening is located at a position spaced at an interval from the receiving opening as viewed from the certain direction and connected to the suction mechanism. The suction air passage forms communication between the receiving opening and the suction opening to cause a suction airflow to pass therethrough generated in response to driving of the suction mechanism. The partitioning member is located in the reservoir region and defines the suction air passage. The suction air passage has a bellows section folded in a bellows shape. The bellows section has a first portion, a second portion, and a third portion. The first portion causes the suction airflow to flow toward one side in a first direction. The second portion is spaced at an interval from the first portion and located on the one side in the first direction with respect to the first portion, and causes the suction airflow to flow toward the one side in the first direction. The third portion is located adjacent to the first portion and the second portion and on one side in a second direction perpendicular to the first direction with respect to the first portion and the second portion, connected to an end of the first portion on the one side in the first direction, connected to an end of the second portion on the other side opposite the one side in the first direction, and causes the suction airflow to flow from the first portion to the second portion. The partitioning member has a first partitioning section, a second partitioning section, and a third partitioning section. The first partitioning section defines the first portion on the one side in the second direction. The second partitioning section defines the second portion on the one side in the second direction. The third partitioning section defines the third portion on the other side opposite the one side in the second direction. The first partitioning section, the second partitioning section, and the third partitioning section overlap each other in the first direction.

DETAILED DESCRIPTION

The following describes an inkjet recording apparatus according to one embodiment of the present disclosure by referring to FIGS. 1 to 11 by taking a printer 100 as an example. The printer 100 is installed on a flat floor surface and used in this state. In the following description, a direction vertical to the flat floor surface on which the printer 100 is installed will be defined as a top-bottom direction.

The printer 100 records (namely, prints) an image on a sheet S as a recording medium. Paper is mainly used as the sheet S. The sheet S of a different type such as an OHP sheet is also available. Alternatively, cloth or cardboard is also available.

<Configuration of Printer>

Figure 1:
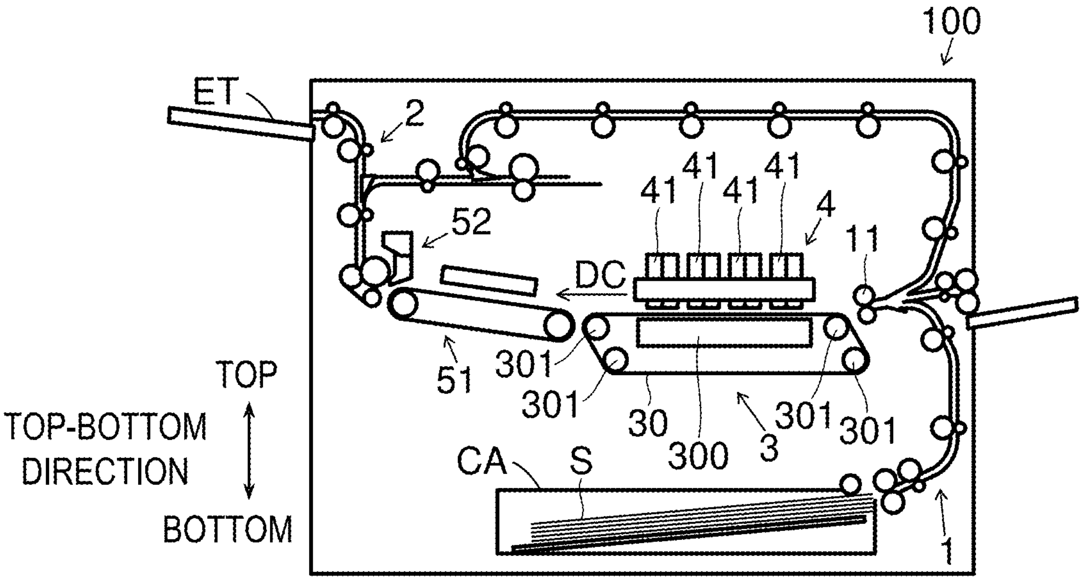
FIG. 1 is an outline view of an inkjet recording apparatus according to one embodiment.

As shown in FIG. 1, the printer 100 of the present embodiment (corresponding to the "inkjet recording apparatus") comprises a first conveyance part 1 and a second conveyance part 2. The first conveyance part 1 feeds the sheet S (corresponding to the "recording medium") placed on a sheet feed cassette CA and conveys the sheet S toward a recording position. A print job implemented by the printer 100 is to record (print) an image on the sheet S passing through the recording position. The second conveyance part 2 conveys the recorded sheet S. The second conveyance part 2 ejects the recorded sheet S to an ejection tray ET.

The first conveyance part 1 comprises a plurality of conveyance roller members including a registration roller pair 11. In FIG. 1, a sign is given only to the registration roller pair 11 of the plurality of conveyance roller members. Each of the plurality of conveyance roller members rotates to convey the sheet S. The registration roller pair 11 includes rollers in a pair contacting each other under pressure. A registration nip is formed between the rollers in a pair. The sheet S fed from the sheet feed cassette CA enters the registration nip. The registration roller pair 11 rotates to convey the sheet S having entered the registration nip toward a belt conveyance part 3 described later.

At a moment when a front edge of the sheet S arrives at the registration nip, the registration roller pair 11 stops rotating. Meanwhile, the conveyance roller members upstream from the registration roller pair 11 in a conveyance direction DC of the sheet S rotate. By doing so, oblique running of the sheet S is corrected.

The printer 100 comprises the belt conveyance part 3. The belt conveyance part 3 receives the sheet S from the first conveyance part 1 and conveys the received sheet S. The belt conveyance part 3 comprises a conveyance belt 30. The conveyance belt 30 has an endless shape and is supported rotatably. The belt conveyance part 3 comprises a plurality of suspension rollers 301. The plurality of suspension rollers 301 are supported rotatably. The conveyance belt 30 is suspend on the plurality of suspension rollers 301 to rotate. The sheet S conveyed from the first conveyance part 1 reaches an outer peripheral surface of the conveyance belt 30.

One of the plurality of suspension rollers 301 is coupled to a belt motor (not shown in the drawings), and rotates in response to transmission of driving force from the belt motor. The rotation of the suspension roller 301 coupled to the belt motor drives the conveyance belt 30 to rotate. At this time, the other suspension rollers 301 are also driven to rotate.

The belt conveyance part 3 includes a suction unit 300. The suction unit 300 is located on an inner peripheral side of the conveyance belt 30. The suction unit 300 sucks the sheet S on the outer peripheral surface of the conveyance belt 30.

Specifically, the conveyance belt 30 has a plurality of suction holes (not shown in the drawings). The suction holes of the conveyance belt 30 penetrate the conveyance belt 30 in a thickness direction thereof. The suction unit 300 sucks the sheet S via the suction holes of the conveyance belt 30. By doing so, the sheet S is sucked on the outer peripheral surface of the conveyance belt 30. The conveyance belt 30 rotates while holding the sheet S under suction on the outer peripheral surface thereof. As a result, the sheet S is conveyed. In other words, the conveyance belt 30 conveys the sheet S while sucking the sheet S on the outer peripheral surface thereof.

The printer 100 includes a recording part 4. The recording part 4 is located in such a manner as to face the outer peripheral surface of the conveyance belt 30 in the top-bottom direction. During conveyance of the sheet S, the sheet S on the outer peripheral surface of the conveyance belt 30 and the recording part 4 face each other with an interval therebetween in the top-bottom direction. By doing so, during conveyance of the sheet S, the sheet S passes through between a nozzle surface of a recording head 40 described later and the outer peripheral surface of the conveyance belt 30. In other words, a part of a conveyance path of the sheet S is formed between the nozzle surface of the recording head 40 and the outer peripheral surface of the conveyance belt 30. In this configuration, the conveyance direction DC of the sheet S being conveyed by the conveyance belt 30 conforms to a horizontal direction.

Figure 2:
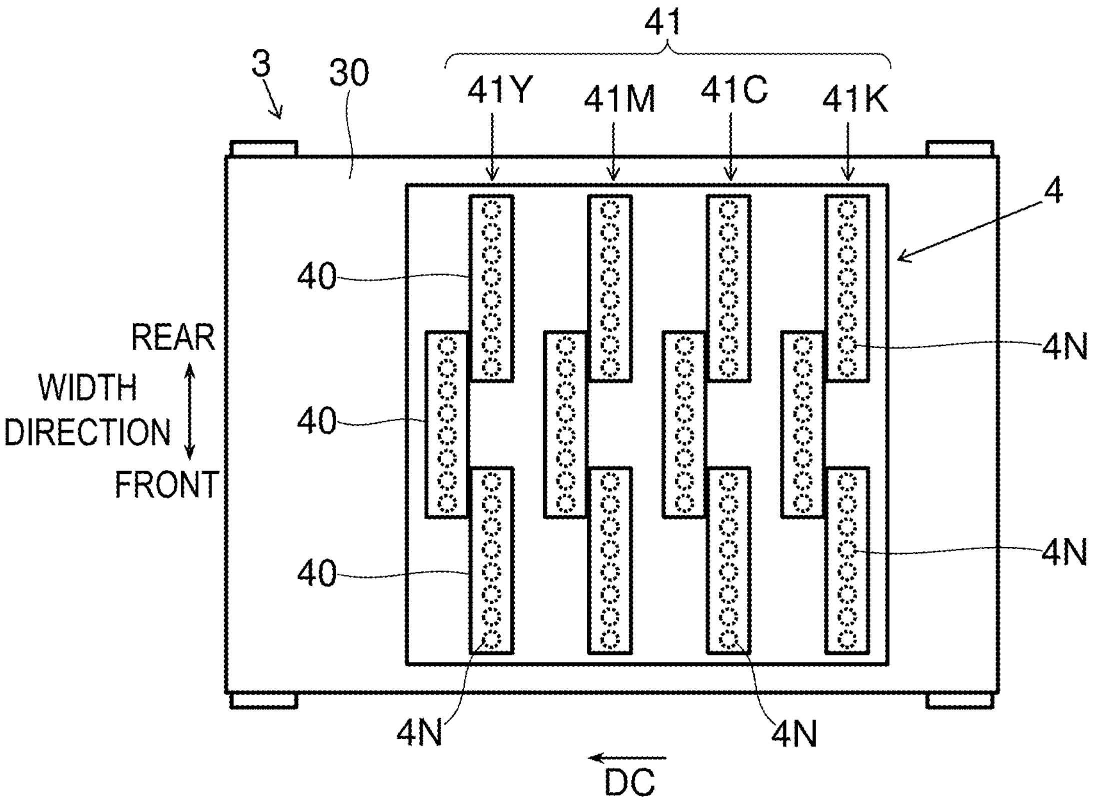
FIG. 2 is a plan view of a recording part of the inkjet recording apparatus according to one embodiment.

As shown in FIG. 2, the recording part 4 includes four line heads 41 corresponding to respective colors of cyan, magenta, yellow, and black. In FIG. 2, the line heads 41 are distinguished from each other by giving a sign “C” to the line head 41 for cyan, a sign “M” to the line head 41 for magenta, a sign “Y” to the line head 41 for yellow, and a sign “K” to the line head 41 for black. This also applies to FIG. 5 referred to in the following description.

Each of the line head 41 for a corresponding color includes a plurality of (for example, three) recording heads 40. For example, the plurality of recording heads 40 for a respective color are arranged in a staggered pattern in a direction perpendicular to the conveyance direction DC in which the sheet S is conveyed by the conveyance belt 30. In the following description, the direction perpendicular to the conveyance direction DC in which the sheet S is conveyed by the conveyance belt 30 may be called a width direction simply.

Each recording head 40 is spaced at an interval from the outer peripheral surface of the conveyance belt 30 in the top-bottom direction. In other words, each recording head 40 is located at a position facing the sheet S in the top-bottom direction conveyed by the conveyance belt 30. In still other words, the conveyance belt 30 conveys the sheet S while sucking the sheet S thereon under each recording head 40. The top-bottom direction is a direction perpendicular to the conveyance direction DC in which the sheet S is conveyed by the conveyance belt 30 and perpendicular to the width direction.

Each recording head 40 has a surface facing the outer peripheral surface of the conveyance belt 30 in the top-bottom direction and having as the nozzle surface. The nozzle surface of each recording head 40 has a plurality of nozzles 4N. The plurality of nozzles 4N of each recording head 40 are used for discharging ink of a corresponding color downward. For example, the number of the nozzles 4N of each recording head 40 is same. These nozzles 4N of each recording head 40 are arranged along the width direction of the conveyance belt 30. In FIG. 2, the nozzles 4N are represented by dashed lines. Note that a larger number of the nozzles 4N are actually provided at each recording head 40. For the sake of convenience, only some of the nozzles 4N are given signs.

Each recording head 40 discharges ink from the nozzles 4N toward the sheet S on the outer peripheral surface of the conveyance belt 30 on the basis of image data to be recorded on the sheet S according to a print job. The ink discharged from each recording head 40 adheres to the sheet S. By doing so, an image is recorded on the sheet S. In other words, a recording position is defined between each recording head 40 and the conveyance belt 30, and the image is recorded on the sheet S at the recording position.

The viscosity of ink remaining at the nozzle 4N of the plurality of nozzles 4N from which the ink is discharged not frequently is increased with time. As a result, clogging occurs to reduce image quality. To reduce the occurrence of such inconvenience, each recording head 40 performs a flushing process. In the flushing process by each recording head 40, ink remaining at the nozzle 4N is discharged. By doing so, the occurrence of clogging is reduced. The flushing process will be described later in detail.

Referring back to FIG. 1, the printer 100 comprises a drying unit 51 and a decurler 52. While the drying unit 51 conveys the sheet S toward the decurler 52, the drying unit 51 dries ink adhering to the sheet S being conveyed. The decurler 52 corrects curl of the sheet S. The decurler 52 conveys the sheet S after subjected to the curl correction toward the second conveyance part 2.

Figure 3:
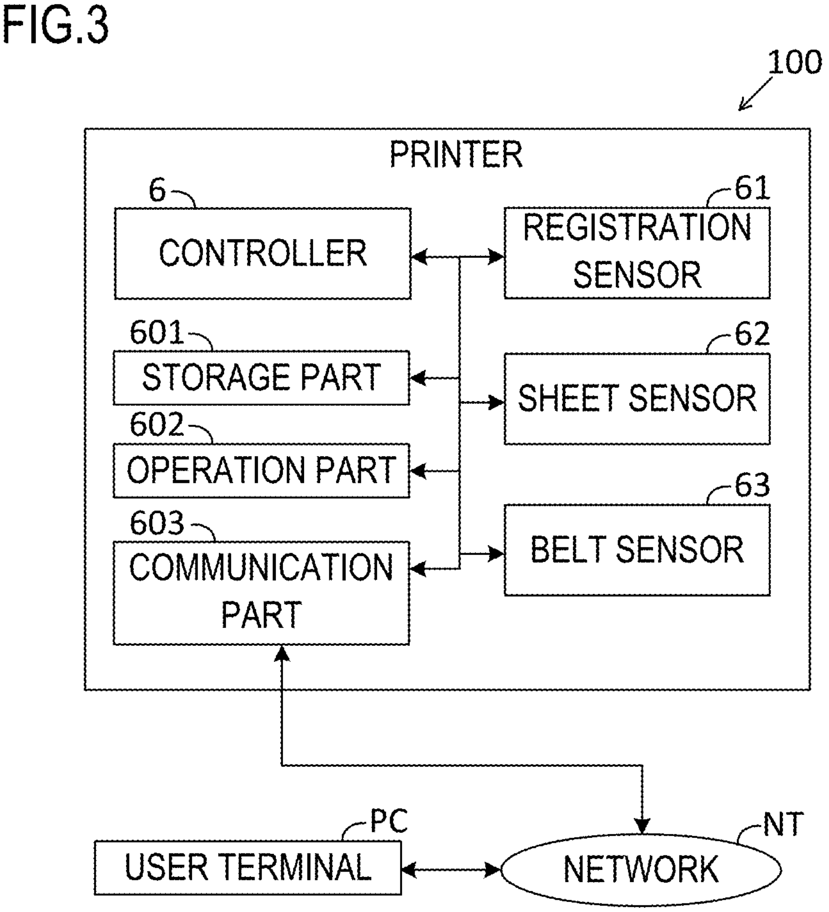
FIG. 3 is a block diagram of the inkjet recording apparatus according to one embodiment.

As shown in FIG. 3, the printer 100 comprises a controller 6. The controller 6 includes a processing circuit such as a CPU and an ASIC. The controller 6 controls a print job. In other words, the controller 6 controls each motion of the first conveyance part 1, the second conveyance part 2, the belt conveyance part 3, the recording part 4, the drying unit 51, and the decurler 52. In still other words, the controller 6 controls conveyance of the sheet S and discharge of ink by each recording head 40. The controller 6 controls the flushing process by each recording head 40.

A registration sensor 61, a sheet sensor 62, and a belt sensor 63 are connected to the controller 6. The controller 6 controls conveyance of the sheet S and image recording on the sheet S on the basis of output from each of the registration sensor 61, the sheet sensor 62, and the belt sensor 63.

The registration sensor 61 makes detection at a detecting position that is a position upstream from the registration nip in the conveyance direction DC of the sheet S. The registration sensor 61 is an optical sensor of a reflective or transmissive type, for example. The registration sensor 61 changes an output value in response to the presence or absence of the sheet S at the corresponding detecting position.

On the basis of the output value from the registration sensor 61, the controller 6 detects arrival of a front edge of the sheet S at the detecting position of the registration sensor 61 and passage of a rear edge of the sheet S through this detecting position. In other words, on the basis of the output value from the registration sensor 61, the controller 6 detects arrival of the front edge of the sheet S at the registration nip and passage of the rear edge of the sheet S through the registration nip. On the basis of time elapsed from when arrival of the front edge of the sheet S is detected at the detecting position of the registration sensor 61, the controller 6 determines timing of start of conveyance of the sheet S using the registration roller pair 11 (timing of start of rotation of the registration roller pair 11).

The sheet sensor 62 makes detection at a detecting position that is a position between the recording position of the line head 41 of the plurality of line heads 41 located most upstream in the conveyance direction DC of the sheet S and the registration nip. The sheet sensor 62 changes an output value in response to the presence or absence of the sheet S at the corresponding detecting position. A contact image sensor (CIS) is available as the sheet sensor 62. An optical sensor of a reflective or transmissive type is also available as the sheet sensor 62. The CIS sensor is used as the sheet sensor 62, for example.

On the basis of the output value from the sheet sensor 62, the controller 6 detects arrival of the front edge of the sheet S at the detecting position of the sheet sensor 62 and passage of the rear edge of the sheet S through this detecting position. On the basis of the output value from the sheet sensor 62, the controller 6 determines timing of discharge of ink to the sheet S conveyed by the conveyance belt 30. Note that the timing of discharge of the ink to the sheet S conveyed by the conveyance belt 30 may be determined on the basis of time elapsed from when conveyance of the sheet S by the registration roller pair 11 is started.

The controller 6 measures sheet transit time taken from when the front edge of the sheet S arrives at the detecting position of the sheet sensor 62 to when the rear edge of the same sheet S passes through the detecting position of the sheet sensor 62. The sheet transit time measured at the detecting position of the sheet sensor 62 changes in response to the size of the sheet S in the conveyance direction DC. Then, on the basis of the sheet transit time, the controller 6 recognizes the size of the sheet S in the conveyance direction DC conveyed by the conveyance belt 30. By doing so, even if the sheet S conveyed by the conveyance belt 30 has an indefinite size, it still becomes possible for the controller 6 to recognize the size of the sheet S in the conveyance direction DC.

The belt sensor 63 is a sensor for detecting a predetermined reference position (home position) of the conveyance belt 30. For example, a certain mark is provided at the reference position of the conveyance belt 30. This allows detection of the reference position of the conveyance belt 30 on the basis of an output value from the belt sensor 63. A CIS is available as the belt sensor 63. An optical sensor of a reflective or transmissive type is also available as the belt sensor 63.

On the basis of the output value from the belt sensor 63, the controller 6 detects the reference position of the conveyance belt 30. In other words, on the basis of the output value from the belt sensor 63, the controller 6 detects the position of a flushing region 31 (flushing hole 30*a*) described later.

The printer 100 comprises a storage part 601. The storage part 601 includes a storage device such as a ROM or a RAM. The storage part 601 is connected to the controller 6. The controller 6 reads information from the storage part 601. The controller 6 writes information into the storage part 601.

The printer 100 comprises an operation part 602. The operation part 602 includes a touch screen, for example. The touch screen displays software buttons, messages, etc., and accepts touching operation from a user. The operation part 602 is further provided with hardware buttons for accepting settings, instructions, etc. The operation part 602 is connected to the controller 6. The controller 6 controls display motion on the operation part 602 (touch screen). The controller 6 detects operation having been performed on the operation part 602.

The printer 100 comprises a communication part 603. The communication part 603 includes a communication circuit, etc. The communication part 603 is connected to a user terminal PC via a network NT. The user terminal PC is an information processor such as a personal computer. The controller 6 communicates with the user terminal PC using the communication part 603. For example, the user terminal PC transmits print data (such as PDL data) including image data to be recorded on the sheet S according to a print job to the printer 100. In other words, the user terminal PC transmits a request for execution of the print job to the printer 100. The print data according to the print job includes various types of setting data relating to printing such as the size of the sheet S to be used in the print job.

<Outline of Flushing Process>

Figure 4:
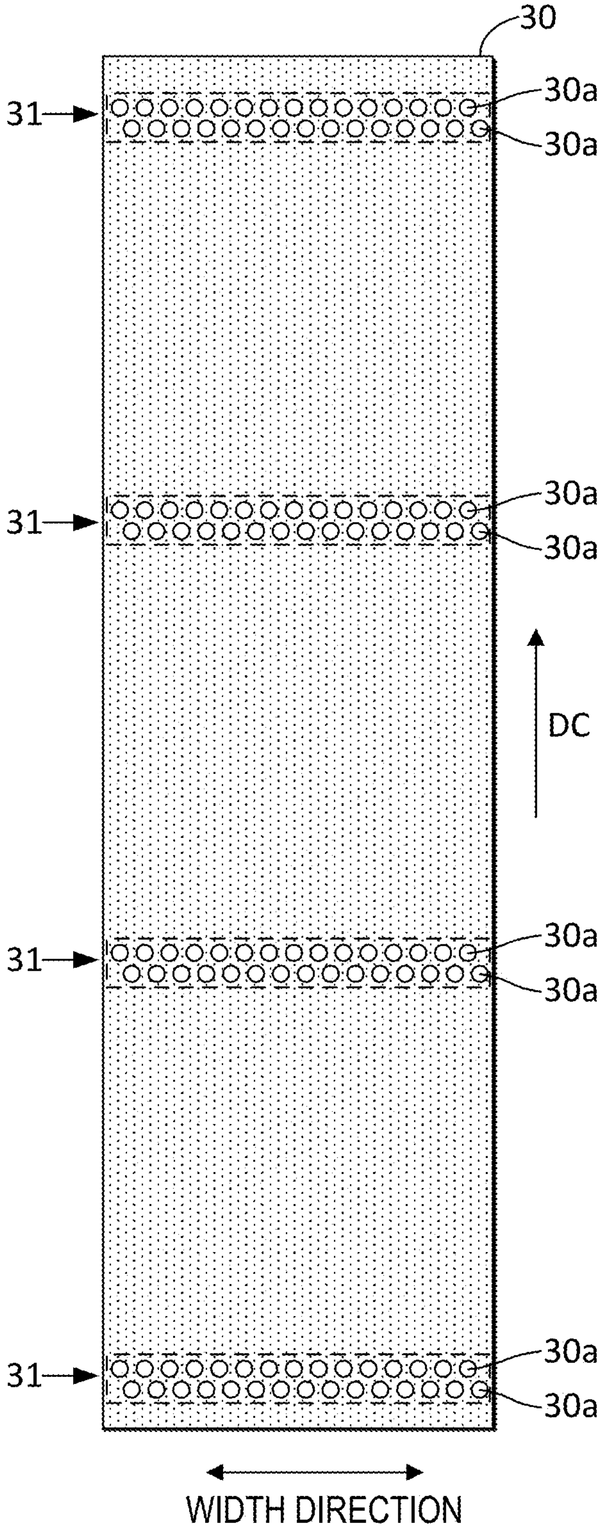
FIG. 4 is a plan view of a conveyance belt of the inkjet recording apparatus according to one embodiment.

As shown in FIG. 4, the conveyance belt 30 has the flushing region 31. In FIG. 4, the flushing region 31 is surrounded by dashed lines. The flushing region 31 is a region including the flushing hole 30*a* that is a through hole penetrating the conveyance belt 30 in the thickness direction thereof. The conveyance belt 30 is provided with a plurality of the flushing regions 31. The plurality of the flushing regions 31 are spaced at a certain interval from each other in a rotation direction of the conveyance belt 30 (the conveyance direction DC of the sheet S).

Each flushing region 31 includes a plurality of the flushing holes 30*a*. An opening shape of each flushing hole 30*a* (a shape viewed from the thickness direction of the conveyance belt 30) is not particularly limited. The shape of the flushing hole 30*a* may be a circular shape, an ellipsoidal shape, an oval shape, or a rectangular shape. In response to the rotation of the conveyance belt 30, each of the plurality of nozzles 4N comes to face at least any of the flushing holes 30*a* in the top-bottom direction.

A process of discharging ink from the nozzle 4N of each recording head 40 is performed as the flushing process. During implementation of the flushing process, the ink is discharged from each nozzle 4N with timing for the nozzle 4N to face the flushing hole 30*a* in the top-bottom direction. Then, the ink passes through the flushing hole 30*a*. This prevents the ink from adhering to the conveyance belt 30 despite implementation of the flushing process. In the following description, the ink discharged from each nozzle 4N during implementation of the flushing process will be called flushing ink to be distinguished from ink to contribute to image recording on the sheet S. The ink not to contribute to image recording on the sheet S is the flushing ink.

During implementation of a print job, the controller 6 controls the flushing process. Specifically, the controller 6 determines timing of start of conveyance of the sheet S from the registration roller pair 11 to the conveyance belt 30 in such a manner that the flushing region 31 appears in a constant cycle between sheets (in an interval between the rear edge of a preceding sheet S to the front edge of a subsequent sheet S). Then, the controller 6 causes discharge of ink from each nozzle 4N with timing of when this nozzle 4N faces the flushing hole 30*a* in the top-bottom direction not overlapping the sheet S. In other words, the controller 6 causes discharge of the ink from each nozzle 4N with timing different from timing of recording an image on the sheet S.

<Storage of Flushing Ink>

The flushing ink is stored in a body of the printer 100 (hereinafter called an apparatus body simply). If the amount of the stored flushing ink becomes a fixed amount, the flushing ink is disposed of.

Specifically, as shown in FIGS. 5 to 9, the printer 100 comprises a waste ink container 7 and a suction mechanism 10 connected to the waste ink container 7. The suction mechanism 10 sucks gas from the waste ink container 7.

During the flushing process, the flushing ink passes through the flushing hole 30*a* of the conveyance belt 30, the flushing ink is sucked by the function of the suction mechanism 10, and then the flushing ink reaches the waste ink container 7. The waste ink container 7 has a reservoir region therein. The waste ink container 7 stores the flushing ink in the reservoir region. As a result of suction by the suction mechanism 10, it becomes unlikely that mist of the flushing ink will go out of the waste ink container 7.

Two or more waste ink containers 7 are provided. The waste ink containers 7 are assigned one by one to each line head 41. In other words, the waste ink containers 7 are assigned one by one to each color of cyan, magenta, yellow, and black.

Each waste ink container 7 is mounted on the inner peripheral side of the conveyance belt 30 of the apparatus body. While each waste ink container 7 is mounted on the apparatus body, the waste ink container 7 is located below the recording head 40 to discharge ink of a corresponding color. Each waste ink container 7 is located in such a manner as to face the nozzle surface of the corresponding recording head 40 across the conveyance belt 30. In other words, each waste ink container 7 is located in such a manner as to face the corresponding recording head 40 across the conveyance path of the sheet S in the top-bottom direction. By doing so, during implementation of the flushing process, the flushing ink passes through the flushing hole 30*a* and the flushing ink is stored in the reservoir region in each waste ink container 7. In this configuration, the top-bottom direction corresponds to a "certain direction."

Each waste ink container 7 is removably mounted on the apparatus body. Each waste ink container 7 can be removed from the apparatus body by being pulled out to the near side from an apparatus front of the printer 100 (frontward in the width direction). If the amount of the stored flushing ink becomes the fixed amount in any of the waste ink containers 7, this waste ink container 7 is removed from the apparatus body and is changed.

Figure 5:
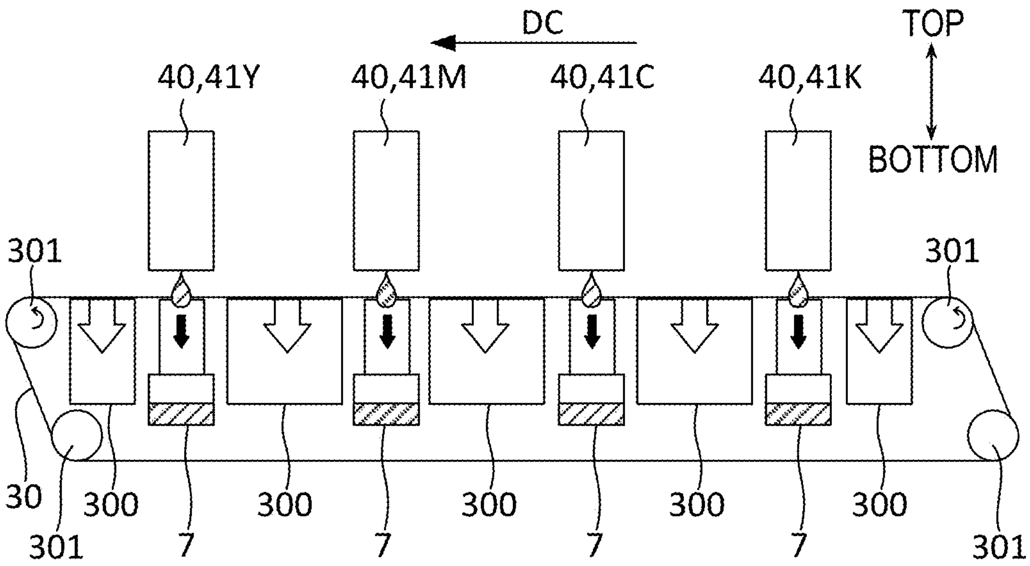
FIG. 5 is a schematic view of the conveyance belt and a periphery of the conveyance belt of the inkjet recording apparatus according to one embodiment.
Figure 6:
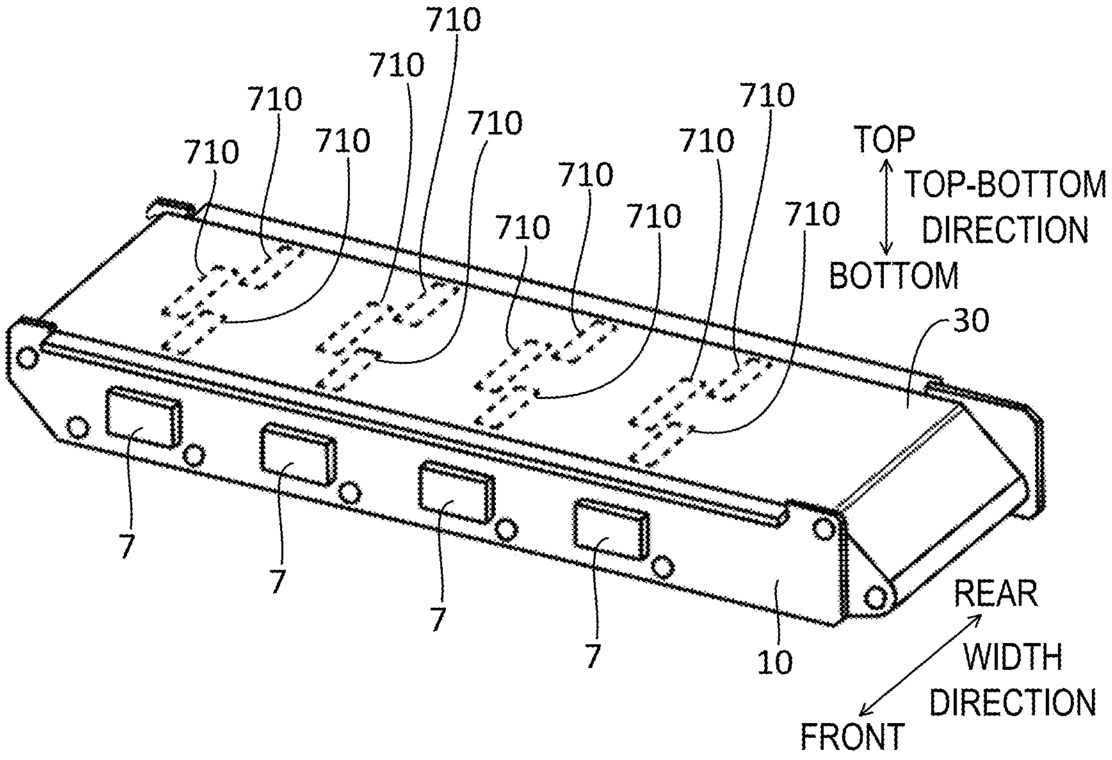
FIG. 6 is a schematic perspective view of the periphery of the conveyance belt of the inkjet recording apparatus according to one embodiment (showing a state where all waste ink containers are mounted)
Figure 7:
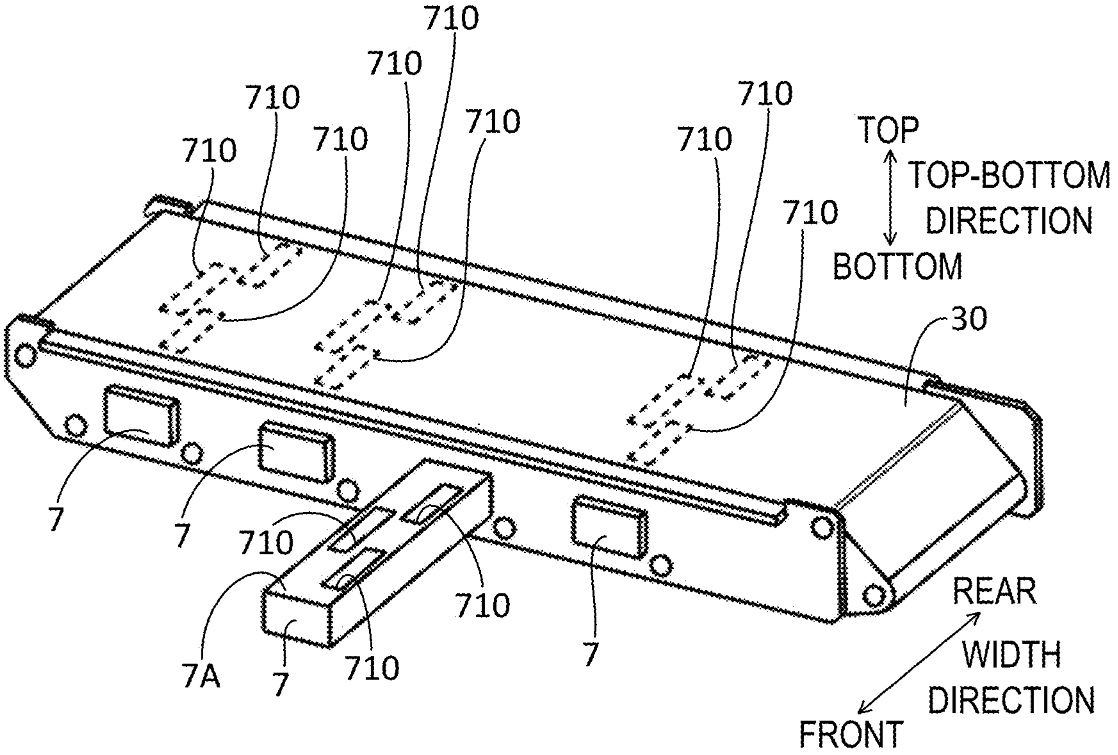
FIG. 7 is a schematic perspective view of the periphery of the conveyance belt of the inkjet recording apparatus according to one embodiment (showing a state where one of the waste ink containers is removed)

The suction mechanism 10 generates a suction airflow. The suction mechanism 10 is assigned individually to each waste ink container 7. Each suction mechanism 10 is connected to the corresponding waste ink container 7, and sucks the flushing ink from the corresponding recording head 40 into the reservoir region in the waste ink container 7. Sucking the flushing ink using the function of each suction mechanism 10 makes it possible to suppress contamination inside the apparatus to be caused by the flushing ink. In FIG. 5, a direction of sucking the flushing ink is represented by black arrows. Hollow arrows represent a direction of suction by the suction unit 300.

Each waste ink container 7 stores ink to be disposed of such as the flushing ink. The ink to be disposed of is ink discharged from the recording head 40 and not to be used for image recording. In other words, each waste ink container 7 stores the ink not to contribute to image recording. In the following description, for the sake of convenience, the ink to be disposed of including the flushing ink will generally be called flushing ink.

<Configuration of Waste Ink Container>

Attention will be focused on one waste ink container 7 and the configuration thereof will be described below by referring to FIGS. 8 and 9. Each waste ink container 7 has the same configuration each other. Thus, the following description will also be applied to the configurations of the other waste ink containers 7 and descriptions of these configurations will be omitted.

As viewed from the top-bottom direction (corresponding to the "certain direction"), the waste ink container 7 has a substantially rectangular shape extending short in one of horizontal directions perpendicular to the top-bottom direction and extending long in the other direction perpendicular to the one direction. Then, in the following description, of the horizontal directions perpendicular to the top-bottom direction, the one direction may be called a short-side direction DS and the other direction perpendicular to the one direction may be called a long-side direction DL. The short-side direction DS is a direction parallel to the conveyance direction DC in which the sheet S is conveyed by the conveyance belt 30. The long-side direction DL corresponds to the width direction of the conveyance belt 30 (a direction perpendicular to the rotation direction of the conveyance belt 30).

Note that FIGS. 8 and 9 referred to in the following description show the reservoir region in the waste ink container 7 schematically and do not show dimensions, shapes, etc. directly in an actual case. This also applies to FIGS. 10 to 12.

The waste ink container 7 is a container like a rectangular parallelepiped. The waste ink container 7 has a ceiling section 7A, and a bottom section 7B facing the ceiling section 7A in the top-bottom direction. The waste ink container 7 has a side wall section (a sign thereof is omitted) surrounding a region between the ceiling section 7A and the bottom section 7B from a lateral side (namely, from a direction perpendicular to the certain direction). The waste ink container 7 has an internal region surrounded by the ceiling section 7A, the bottom section 7B, and the side wall section and having as the reservoir region for the flushing ink.

The waste ink container 7 (namely, the ceiling section 7A, the bottom section 7B, and the side wall section) is composed of a material impermeable to gas. The waste ink container 7 is composed of a material substantially impermeable to the flushing ink in a mist form (namely, gas containing the flushing ink). The waste ink container 7 has lower gas permeability than at least an absorbing member 8 described later. The waste ink container 7 is composed of sheet metal, for example. The waste ink container 7 may be composed of resin.

The ceiling section 7A functions as an ink receiver to receive the flushing ink sucked by the suction mechanism 10. Specifically, the ceiling section 7A has a receiving opening 710 of a rectangular shape penetrating the ceiling section 7A in the top-bottom direction. The receiving opening 710 includes a plurality of the receiving openings 710. Note that the receiving opening 710 is opened upward. In other words, a direction in which the receiving opening 710 is opened is the top-bottom direction. In FIG. 8, the receiving opening 710 is represented by dashed lines.

The receiving opening 710 is assigned individually to each recording head 40. If there are three recording heads 40, three receiving openings 710 are provided. Each receiving opening 710 faces the corresponding recording head 40 across the conveyance belt 30 (namely, the conveyance path of the sheet S) in the top-bottom direction. For this reason, all the receiving openings 710 are spaced at intervals from each other as viewed from the top-bottom direction.

Each receiving opening 710 is an opening for collecting the flushing ink discharged from the corresponding recording head 40 into the reservoir region in the waste ink container 7. The flushing ink from each recording head 40 passes through the corresponding receiving opening 710 to reach the reservoir region in the waste ink container 7.

As viewed from the top-bottom direction, one receiving opening 710 of the three receiving openings 710 is spaced at an interval in the short-side direction DS from a suction opening 730 described later. As viewed from the top-bottom direction, this receiving opening 710 is located in a central area of the waste ink container 7 (specifically, the ceiling section 7A) in the long-side direction DL. In the following description, the one receiving opening 710 will be called a center receiving opening 711. An opening shape of the center receiving opening 711 viewed from the top-bottom direction is a substantially rectangular shape extending in the long-side direction DL as a long-side direction thereof.

As viewed from the top-bottom direction, the other two receiving openings 710 of the three receiving openings 710 different from the center receiving opening 711 are spaced at an interval therebetween in the long-side direction DL across the suction opening 730 described later. One of these two receiving openings 710 is located on a rear side (one side in the width direction) and the other is located on a front side (the other side in the width direction). In the following description, one of these two receiving openings 710 will be called a rear-side receiving opening 712 and the other will be called a front-side receiving opening 713. An opening shape of each of the rear-side receiving opening 712 and the front-side receiving opening 713 viewed from the top-bottom direction is a substantially rectangular shape extending in the long-side direction DL as a long-side direction thereof.

The waste ink container 7 includes the absorbing member 8. The absorbing member 8 is located in the reservoir region in the waste ink container 7. The absorbing member 8 is a porous member to absorb the flushing ink. Melamine sponge is available as a constituting material for the absorbing member 8. The absorbing member 8 absorbs the flushing ink and retains the flushing ink therein.

The waste ink container 7 has a suction air passage 70 in the reservoir region and defined by the absorbing member 8. Namely, the absorbing member 8 corresponds to a "partitioning member." The suction air passage 70 is defined by space in the reservoir region in the waste ink container 7 where the absorbing member 8 is absent (namely, a gap in the reservoir region). The suction air passage 70 is space obtained by making a partial cutout from the absorbing member 8. The suction air passage 70 is space surrounded by the absorbing member 8. The absorbing member 8 functions as a partition wall defining the suction air passage 70. The suction air passage 70 causes the suction airflow to pass therethrough generated in response to driving of the suction mechanism 10.

The suction air passage 70 is connected to each of the plurality of receiving openings 710. In other words, the suction air passage 70 includes a plurality of the suction air passages 70. In the following description, the suction air passages 70 may be distinguished from each other by giving a sign 71 to the suction air passage 70 connected to the center receiving opening 711, a sign 72 to the suction air passage 70 connected to the rear-side receiving opening 712, and a sign 73 to the suction air passage 70 connected to the front-side receiving opening 713.

The waste ink container 7 has a merging chamber 720 provided in the reservoir region and defined by the absorbing member 8. As viewed from the top-bottom direction, the merging chamber 720 is located at a position spaced at an interval from each of the plurality of receiving openings 710. Like the suction air passage 70, the merging chamber 720 is defined by space in the reservoir region in the waste ink container 7 where the absorbing member 8 is absent.

As viewed from the top-bottom direction, the merging chamber 720 has a rectangular shape. As viewed from the top-bottom direction, the merging chamber 720 has sides in a pair parallel to the short-side direction DS and sides in a pair parallel to the long-side direction DL. The absorbing member 8 defines the merging chamber 720 on one side and the other side in the short-side direction DS, and defines the merging chamber 720 on one side and the other side in the long-side direction DL. The absorbing member 8 further defines the merging chamber 720 on one side (top side) in the top-bottom direction, and defines the merging chamber 720 on the other side (bottom side) in the top-bottom direction. In this way, the absorbing member 8 functions as a partition wall defining the merging chamber 720. The merging chamber 720 is a chamber for merging the plurality of suction air passages 70 with each other.

The waste ink container 7 has the suction opening 730 provided in the merging chamber 720. In other words, as viewed from the top-bottom direction, the suction opening 730 is located at a position spaced at an interval from each of the plurality of receiving openings 710. The plurality of suction air passages 70 is connected to the suction opening 730. The plurality of suction air passages 70 form communications between each of the plurality of receiving openings 710 and the suction opening 730. The suction opening 730 forms communication between the merging chamber 720 and the outside of the reservoir region. The suction opening 730 is connected to the suction mechanism 10.

The waste ink container 7 has a circular cylindrical duct 731. The absorbing member 8 has an opening 80 penetrating the absorbing member 8 toward the bottom side from the merging chamber 720. The duct 731 is inserted in the opening 80 of the absorbing member 8 in such a manner that a cylindrical axis direction thereof conforms to the top-bottom direction. Furthermore, the duct 731 is inserted in the opening 80 of the absorbing member 8 in such a manner that one end thereof in the top-bottom direction (namely, in the cylindrical axis direction) is located in the merging chamber 720. The waste ink container 7 has a hollow in the duct 731 functioning as the suction opening 730.

The bottom section 7B has a connection opening (a sign thereof is omitted) penetrating the bottom section 7B in the top-bottom direction. The duct 731 extends upward in a circular cylindrical shape from an edge of the connection opening of the bottom section 7B. The suction mechanism 10 is located outside the waste ink container 7 and is connected to the connection opening at the bottom section 7B. In other words, the suction mechanism 10 is connected to the other end of the duct 731 opposite the one end thereof in the top-bottom direction. In response to driving of the suction mechanism 10 connected to the duct 731, the suction airflow flows from each receiving opening 710 toward the merging chamber 720 (namely, toward the suction opening 730).

Figure 8:
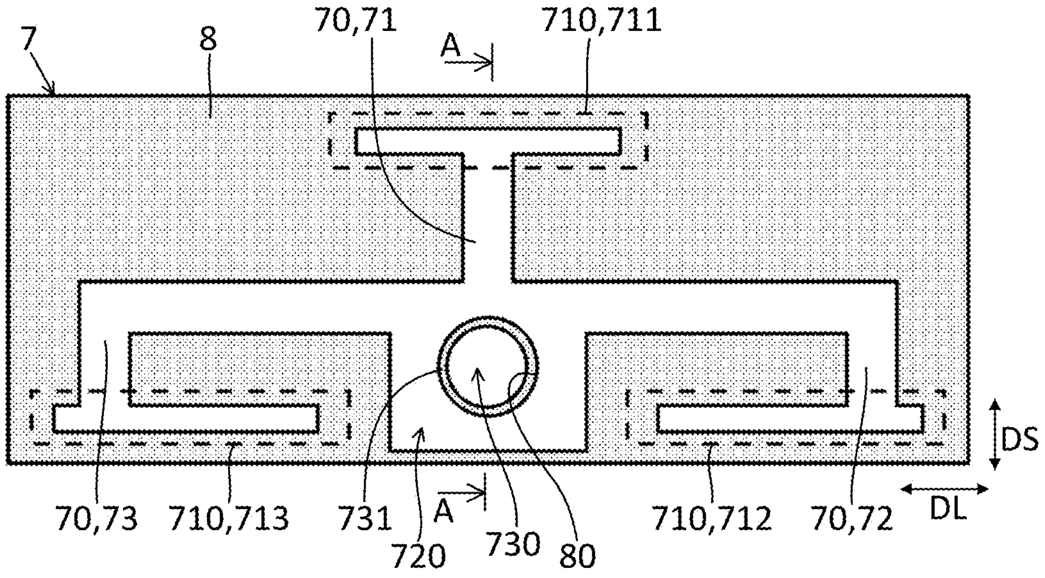
FIG. 8 is a schematic view showing a reservoir region in the waste ink container of the inkjet recording apparatus according to one embodiment.

Note that the shape of each suction air passage 70 viewed from the top-bottom direction in FIG. 8 is shown as one example. The shape of each suction air passage 70 viewed from the top-bottom direction is not particularly limited. For example, the suction air passage 71 may be merged with at least one of the suction air passages 72 and 73.

<Shape of Suction Air Passage>

The suction airflow contains mist of the flushing ink. If the flushing ink in a mist form leaks out via the suction opening 730, inconvenience such as contamination inside the printer 100 is caused. To reduce the occurrence of such inconvenience, it is necessary to separate gas flowing in the suction air passage 70 (namely, gas sucked by the suction mechanism 10) and the flushing ink favorably from each other in the reservoir region in the waste ink container 7 to absorb the flushing ink in the absorbing member 8. In other words, it is necessary to increase efficiency in collecting the flushing ink in the reservoir region in the waste ink container 7.

To increase efficiency in collecting the flushing ink in the reservoir region in the waste ink container 7, an inner wall of each suction air passage 70 is defined by the absorbing member 8. In this configuration, efficiency in collecting the flushing ink is increased by absorbing the flushing ink in the absorbing member 8. With more bends of each suction air passage 70, the flushing ink contained in gas flowing through each suction air passage 70 is separated more easily by centrifugal force, thereby increasing efficiency in collecting the flushing ink.

Figure 9:
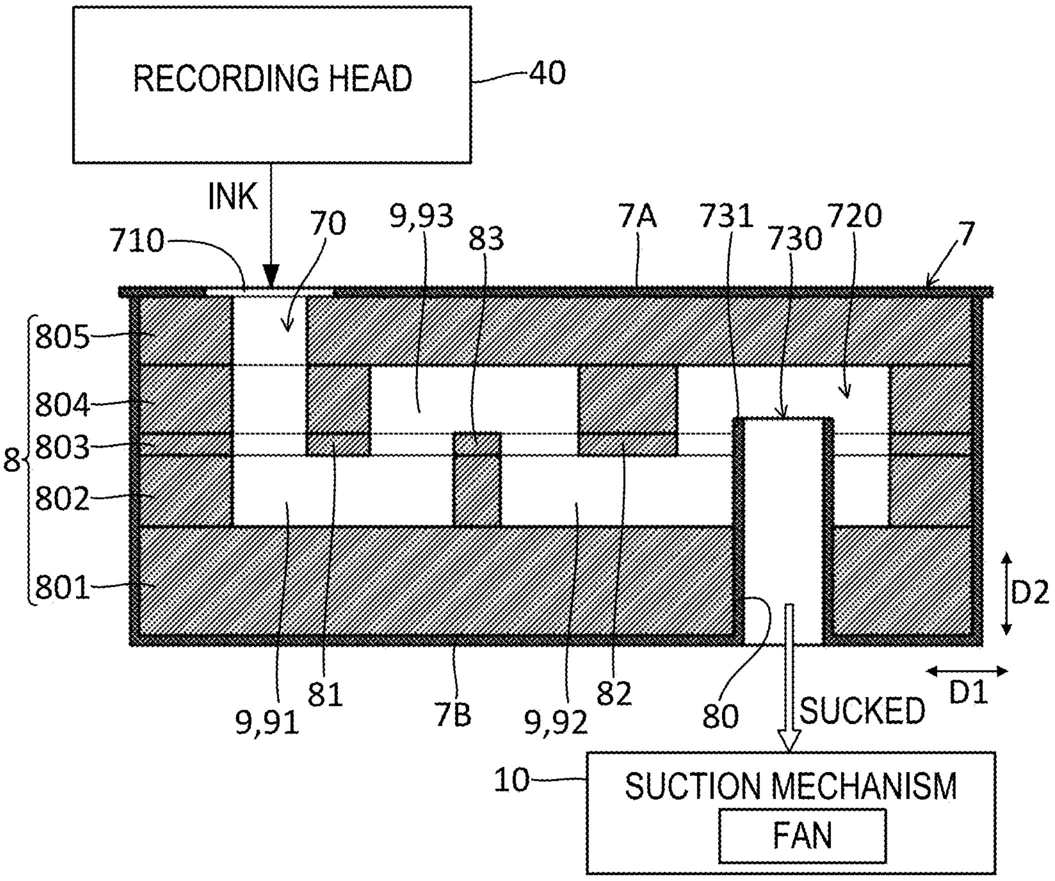
FIG. 9 is a schematic view corresponding to a section taken along a line A-A shown in FIG. 8.

As shown in FIG. 9, to increase efficiency in collecting the flushing ink, a bellows section 9 is provided at at least one suction air passage 70. The bellows section 9 is a section folded in a bellows shape. As the suction air passage 70 having the bellows section 9 is formed using the absorbing member 8, the absorbing member 8 is configured as a stack including a plurality of stacked layers. In the illustrations in the drawings referred to in the following description, the suction air passage 71 includes the bellows section 9. However, at least one of the suction air passages 72 and 73 may include the bellows section 9. Each suction air passage 70 may include the bellows section 9, for example. In another case, the bellows section 9 may be absent at any of the suction air passages 70 and the suction air passage 70 without the bellows section 9 may be merged with the suction air passage 70 with the bellows section 9.

The bellows section 9 is a section folded in a folding direction conforming to the top-bottom direction. In other words, the bellows section 9 is a section with recesses and projections formed in the top-bottom direction and arranged continuously in a direction toward the suction opening 730 (namely, in the horizontal direction). In still other words, the bellows section 9 is a section bent in a bellows shape in a sectional view obtained by cutting the reservoir region in the waste ink container 7 (namely, the absorbing member 8) along a plane perpendicular to the horizontal direction.

At the suction air passage 70 with the bellows section 9, the suction airflow flowing toward the suction opening 730 is bent at the bellows section 9. At this time, centrifugal force acts to separate the flushing ink from gas. The suction airflow is bent several times at the bellows section 9. Bending the suction airflow several times increases efficiency in collecting the flushing ink.

As an example, while not shown in the drawings, bending the suction air passage 70 in the horizontal direction and increasing the number of times the suction airflow is bent also increases efficiency in collecting the flushing ink. In this case, however, the suction air passage 70 partially projects in the horizontal direction. This may cause interference of any of the suction air passages 70 with a different one of the suction air passages 70. This results in the occurrence of inconvenience such as breakage of a partition wall between the two suction air passages 70. Furthermore, the excessively small interval itself in the horizontal direction between the two suction air passages 70 causes inconvenience of failing to manufacture the suction air passage 70 using the absorbing member 8.

As viewed from the top-bottom direction, the suction air passage 70 is formed at a position that depends on the position of the receiving opening 710 in the horizontal direction (namely, the position of the recording head 40 in the horizontal direction). For this reason, it is difficult to take a countermeasure of changing the forming position of the suction air passage 70 as viewed from the top-bottom direction for a purpose of reducing the occurrence of the foregoing inconvenience.

In response to this, the bellows section 9 is formed by bending the suction air passage 70 in the top-bottom direction. By doing so, even if there is not enough space in a plan view from the top-bottom direction, it still becomes possible to provide the bellows section 9 at the suction air passage 70 without causing interference between the suction air passages 70 adjacent to each other.

The following describes the configuration of the bellows section 9 in detail in a sectional view obtained by cutting the reservoir region in the waste ink container 7 (namely, the absorbing member 8) along a plane perpendicular to the horizontal direction. In the following description, a direction perpendicular to the top-bottom direction (namely, the horizontal direction) will be given a sign D1, and the top-bottom direction will be given a sign D2. The horizontal direction D1 corresponds to a "first direction," and the top-bottom direction D2 corresponds to a "second direction."

The bellows section 9 has a first portion 91 and a second portion 92. The first portion 91 is extended in the horizontal direction D1 and causes the suction airflow to flow toward one side in the horizontal direction D1. The second portion 92 is extended in the horizontal direction D1 and causes the suction airflow to flow toward the one side in the horizontal direction D1. The second portion 92 is spaced at an interval in the horizontal direction D1 from the first portion 91.

In the sectional view obtained by cutting the reservoir region in the waste ink container 7 (namely, the absorbing member 8) along the plane perpendicular to the horizontal direction, the suction airflow flows in each of the first portion 91 and the second portion 92 in a direction conforming to the horizontal direction D1. The one side in the horizontal direction D1 corresponds to a downstream side in the flow direction of the suction airflow. The other side in the horizontal direction D1 corresponds to an upstream side in the flow direction of the suction airflow.

The bellows section 9 has a third portion 93. The third portion 93 is extended in the horizontal direction D1 and causes the suction airflow to flow toward the one side in the horizontal direction D1. The third portion 93 is located adjacent to the first portion 91 and the second portion 92 and on one side in the top-bottom direction D2 with respect to the first portion 91 and the second portion 92. The third portion 93 is connected to an end of the first portion 91 on the one side in the horizontal direction D1 (namely, on the downstream side in the flow direction of the suction airflow). The third portion 93 is connected to an end of the second portion 92 on the other side opposite the one side in the horizontal direction D1 (namely, on the upstream side in the flow direction of the suction airflow). In this way, the third portion 93 causes the suction airflow to flow from the first portion 91 to the second portion 92. A path of the suction airflow reaching the second portion 92 from the first portion 91 via the third portion 93 is bent in a bellows shape.

As an example, one side in the top-bottom direction D2 is a top side and the other side in the top-bottom direction D2 is a bottom side. In this case, the third portion 93 is located on the top side with respect to the first portion 91 and the second portion 92. However, the third portion 93 is not limited to this. The third portion 93 may be located on the bottom side with respect to the first portion 91 and the second portion 92.

For partitioning the bellows section 9, the absorbing member 8 has a first partitioning section 81, a second partitioning section 82, and a third partitioning section 83. The first partitioning section 81, the second partitioning section 82, and the third partitioning section 83 define bends on inner sides thereof existing at the bellows section 9. Specifically, the first partitioning section 81 defines the first portion 91 on the one side in the top-bottom direction D2. The second partitioning section 82 defines the second portion 92 on the one side in the top-bottom direction D2. The third partitioning section 83 defines the third portion 93 on the other side opposite the one side in the top-bottom direction D2.

Figure 10:
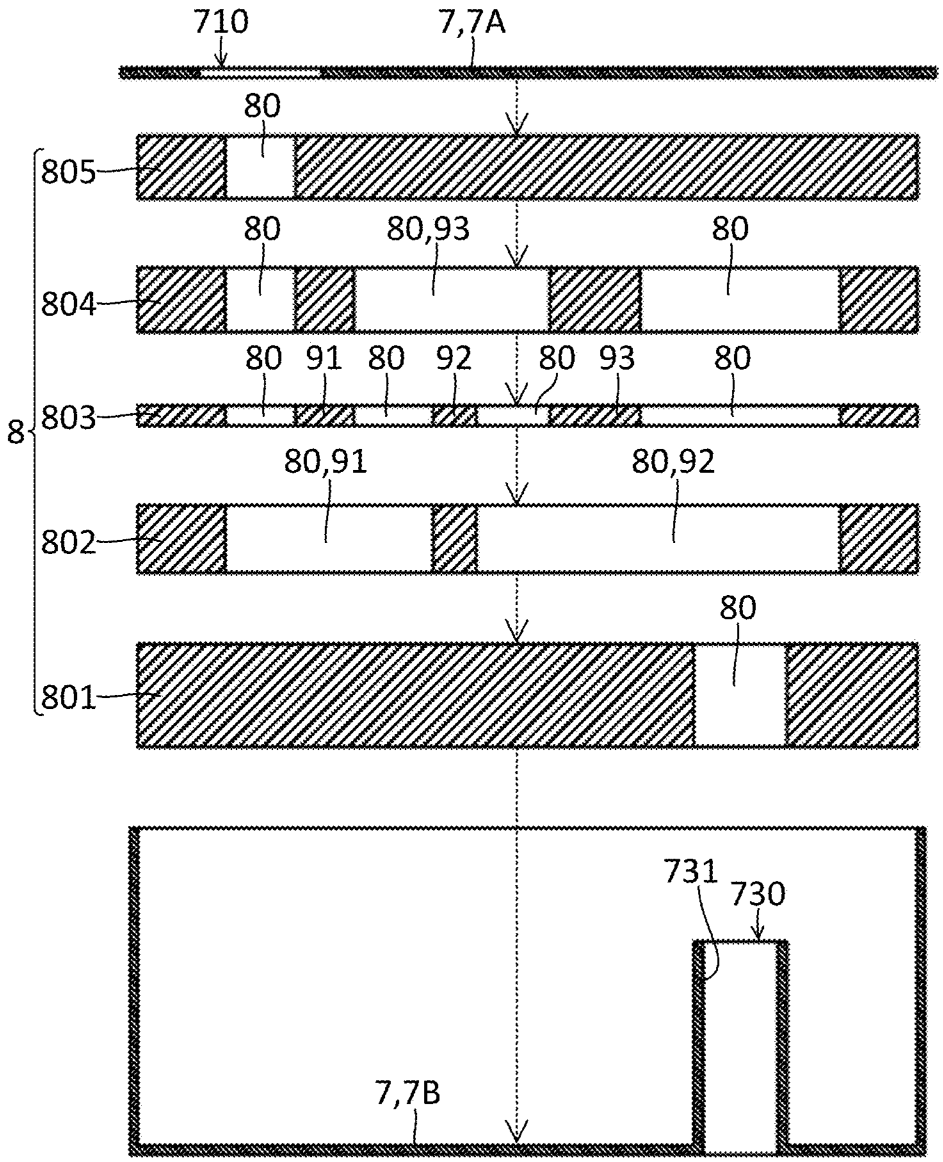
FIG. 10 is an exploded sectional view of an absorbing member shown in FIG. 9.

As shown in FIG. 10, the absorbing member 8 is composed of five layers including a first absorbing layer 801, a second absorbing layer 802, a third absorbing layer 803, a fourth absorbing layer 804, and a fifth absorbing layer 805. The first to fifth absorbing layers 801 to 805 correspond to "layers." The first to fifth absorbing layers 801 to 805 are stacked in this order from the bottom side toward the top side. All the first to fifth absorbing layers 801 to 805 are composed of a porous member to absorb the flushing ink.

The first to fifth absorbing layers 801 to 805 each have at least one opening 80 penetrating the corresponding absorbing layer in the top-bottom direction D2. By stacking the first to fifth absorbing layers 801 to 805 in this order in the top-bottom direction D2 and forming communication in the top-bottom direction D2 between the openings 80 adjacent to each other in the top-bottom direction D2, space composed of a combination of the respective openings 80 at the first to fifth absorbing layers 801 to 805 is extended from the receiving opening 710 to the suction opening 730. The suction air passage 70 is defined by the space composed of the combination of the respective openings 80 at the first to fifth absorbing layers 801 to 805. This facilitates formation of the suction air passage 70 with the bellows section 9. Specifically, the suction air passage 70 can be formed simply by forming the respective openings 80 at the first to fifth absorbing layers 801 to 805 using a mold, and then stacking the first to fifth absorbing layers 801 to 805.

The first absorbing layer 801 is located on a bottom surface of the bottom section 7B. The first absorbing layer 801 has the opening 80 to function as the suction opening 730. In other words, the first absorbing layer 801 has the opening 80 in which the duct 731 is inserted. The first absorbing layer 801 defines each of the first portion 91 and the second portion 92 of the bellows section 9 on the other side in the top-bottom direction D2. The first absorbing layer 801 defines the merging chamber 720 on the other side in the top-bottom direction D2.

The second absorbing layer 802 is located on the first absorbing layer 801. The second absorbing layer 802 has the opening 80 to function as the first portion 91 and the opening 80 to function as the second portion 92. In other words, the second absorbing layer 802 corresponds to "one layer." The second absorbing layer 802 has the opening 80 to function as the merging chamber 720.

The third absorbing layer 803 is located on the second absorbing layer 802. The fourth absorbing layer 804 is located on the third absorbing layer 803. The fourth absorbing layer 804 has the opening 80 to function as the third portion 93. In other words, the fourth absorbing layer 804 corresponds to "the other layer." The fourth absorbing layer 804 has the opening 80 to function as the merging chamber 720.

The third absorbing layer 803 is interposed between the second absorbing layer 802 and the fourth absorbing layer 804 in the top-bottom direction D2. The third absorbing layer 803 has the opening 80 to function as a connection opening between the first portion 91 and the third portion 93, and has the opening 80 to function as a connection opening between the second portion 92 and the third portion 93. By doing so, the third absorbing layer 803 forms communication between the first portion 91 and the third portion 93 and forms communication between the second portion 92 and the third portion 93. In this configuration, the third absorbing layer 803 corresponds to an "intermediate layer." The third absorbing layer 803 has the opening 80 to function as the merging chamber 720.

The fifth absorbing layer 805 is located on the fourth absorbing layer 804. The opening 80 at the fifth absorbing layer 805 communicates with the suction opening 730. The fifth absorbing layer 805 defines the third portion 93 of the bellows section 9 on the one side in the top-bottom direction D2. Furthermore, the fifth absorbing layer 805 defines the merging chamber 720 on the one side in the top-bottom direction D2.

Figure 11:
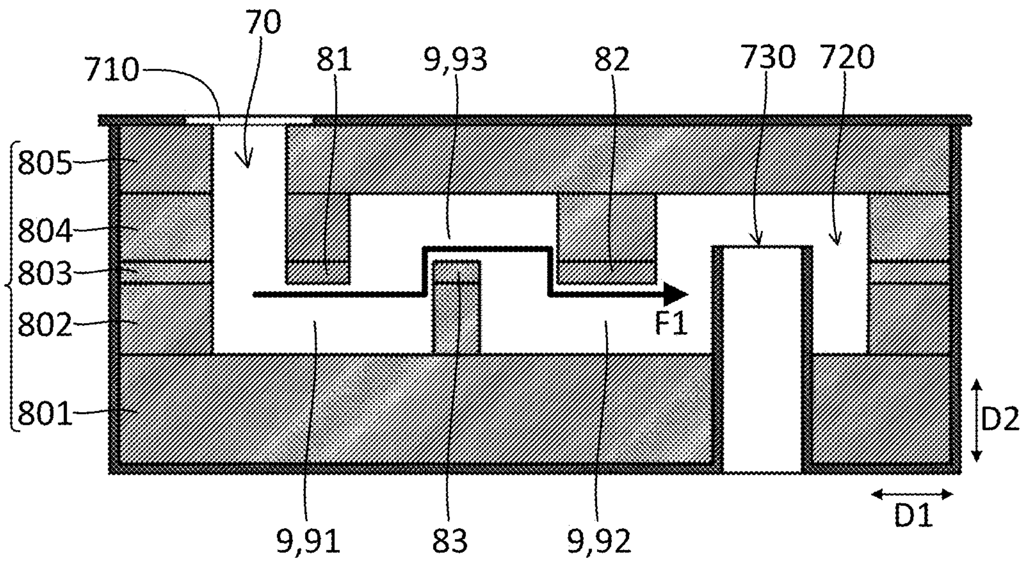
FIG. 11 is a view showing a flow path of a suction airflow flowing through a suction air passage shown in FIG. 9.

As shown in FIG. 11, the presence of the third absorbing layer 803 bends the suction airflow between the second absorbing layer 802 and the fourth absorbing layer 804 in the top-bottom direction D2. A flow path of the suction airflow determined in this case is represented by an arrow F1.

Figure 12:
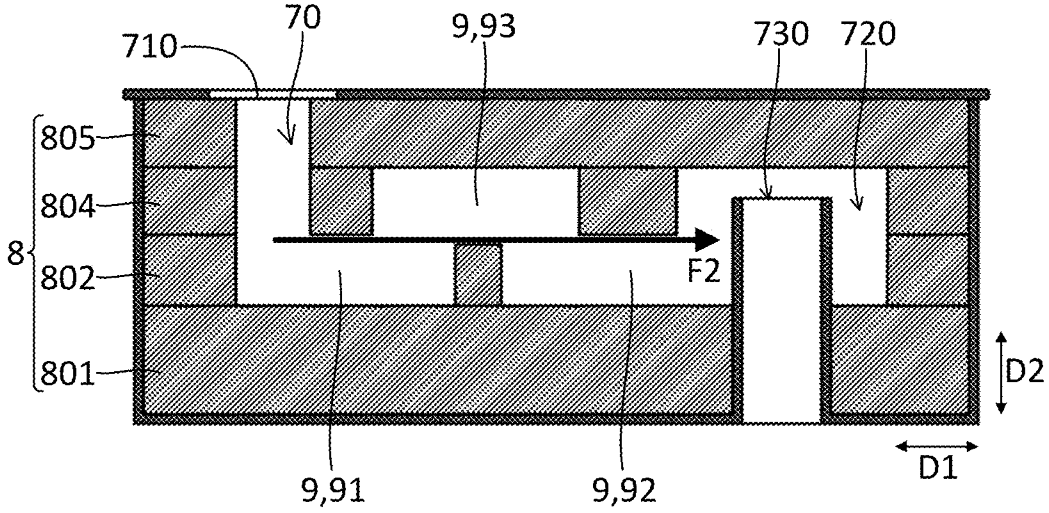
FIG. 12 is a view for explaining inconvenience occurring if a bellows section is not formed with high accuracy.

On the other hand, as shown in FIG. 12, it is still possible to provide the bellows section 9 at the suction air passage 70 even without the third absorbing layer 803. However, there is limitation on processing accuracy relating to the absorbing member 8. This may cause inconvenience as follows due to dimensional tolerance.

For example, reducing the thickness of at least one of the second absorbing layer 802 and the fourth absorbing layer 804 in the top-bottom direction D2 in an area around the opening 80 (namely, in a section defining a bend on the inner side thereof existing at the bellows section 9) may make the suction airflow reach the suction opening 730 without bending the suction airflow between the second absorbing layer 802 and the fourth absorbing layer 804 in the top-bottom direction D2. In the illustration in FIG. 12, the suction airflow may flow along a path represented by an arrow F2 in the drawing. In this case, the flushing ink is not separated favorably from gas.

Then, in the present embodiment, the third absorbing layer 803 is located between the second absorbing layer 802 and the fourth absorbing layer 804 in the top-bottom direction D2. The third absorbing layer 803 is a layer having the first partitioning section 81, the second partitioning section 82, and the third partitioning section 83 integrally. Thus, the first partitioning section 81, the second partitioning section 82, and the third partitioning section 83 overlap each other in the horizontal direction D1 (namely, in the direction toward the suction opening 730).

By doing so, it becomes possible to reduce the occurrence of inconvenience of making the suction airflow reach the suction opening 730 without bending the suction airflow despite the provision of the bellows section 9 at the suction air passage 70. By bending the suction airflow at the bellows section 9, separation of the flushing ink from gas proceeds favorably. As a result, efficiency in collecting the flushing ink in the reservoir region in the waste ink container 7 is increased. Furthermore, leakage of the flushing ink from the waste ink container 7 is suppressed. Suppressing leakage of the flushing ink from the waste ink container 7 reduces the occurrence of inconvenience such as contamination inside the apparatus (contamination of the suction mechanism 10, for example) with the flushing ink.

If efficiency in collecting the flushing ink in the reservoir region in the waste ink container 7 is increased, the flushing ink to reach as far as the suction mechanism 10 is reduced. This allows reduction in the occurrence of failure of a fan. Reducing the flushing ink to reach as far as the suction mechanism 10 further makes it possible to reduce a frequency of change of a filter provided at the fan.

In the present embodiment, the first partitioning section 81, the second partitioning section 82, and the third partitioning section 83 are provided in the third absorbing layer 803. This makes it possible to reduce the occurrence of the inconvenience illustrated in FIG. 12. In other words, it becomes possible to reduce the occurrence of a path along which the suction airflow reaches the suction opening 730 without being bent between the second absorbing layer 802 and the fourth absorbing layer 804 in the top-bottom direction D2. This configuration is achieved simply by interposing the third absorbing layer 803 between the second absorbing layer 802 and the fourth absorbing layer 804 in the top-bottom direction D2, thereby facilitating assembly. Note that the third absorbing layer 803 is a single layer. This can prevent increase in layers forming the absorbing member 8 (namely, parts count).

In the present embodiment, the absorbing member 8 as the "partitioning member" is located in the reservoir region in the waste ink container 7 and the plurality of suction air passages 70 is formed by the space in the reservoir region in the waste ink container 7 where the absorbing member 8 is absent. Thus, it is possible to easily increase efficiency in collecting the flushing ink. Meanwhile, a member lower in capability of absorbing ink than the absorbing member 8 or not to absorb the ink may be located as the "partitioning member" in the reservoir region in the waste ink container 7 and this member may be used for forming the plurality of suction air passages 70.

It should be understood that the embodiment disclosed this time is illustrative in all aspects and not restrictive. The scope of the present disclosure is defined by the claims and not by the description of the embodiment given above, and covers all changes within meanings and ranges equivalent to those of the claims.

What is claimed is:

1. An inkjet recording apparatus comprising:

a recording head that records an image by discharging ink to a recording medium being conveyed;

a waste ink container located in such a manner as to face the recording head in a certain direction across a conveyance path of the recording medium, having a reservoir region therein, and storing the ink in the reservoir region, the stored ink being discharged from the recording head and not to be used for recording of the image; and a suction mechanism that sucks gas from the waste ink container, wherein the waste ink container includes:

a receiving opening for receiving the ink discharged from the recording head;

a suction opening located at a position spaced at an interval from the receiving opening as viewed from the certain direction and connected to the suction mechanism;

a suction air passage forming communication between the receiving opening and the suction opening to cause a suction airflow to pass therethrough generated in response to driving of the suction mechanism; and a partitioning member located in the reservoir region and defining the suction air passage, the suction air passage includes a bellows section folded in a bellows shape, the bellows section includes:

a first portion causing the suction airflow to flow toward one side in a first direction;

a second portion spaced at an interval from the first portion and located on the one side in the first direction with respect to the first portion, and causing the suction airflow to flow toward the one side in the first direction; and a third portion located adjacent to the first portion and the second portion and on one side in a second direction perpendicular to the first direction with respect to the first portion and the second portion, connected to an end of the first portion on the one side in the first direction, connected to an end of the second portion on the other side opposite the one side in the first direction, and causing the suction airflow to flow from the first portion to the second portion, the partitioning member includes:

a first partitioning section defining the first portion on the one side in the second direction;

a second partitioning section defining the second portion on the one side in the second direction; and a third partitioning section defining the third portion on the other side opposite the one side in the second direction, and the first partitioning section, the second partitioning section, and the third partitioning section overlap each other in the first direction;

wherein:

the first direction is a horizontal direction and the second direction is a top-bottom direction, the partitioning member is composed of a plurality of layers stacked in the second direction, the plurality of layers each has an opening penetrating the corresponding layer in the second direction, space composed of a combination of the respective openings at the plurality of layers is extended from the receiving opening to the suction opening by stacking the plurality of layers in the second direction and forming communication between the openings adjacent to each other in the second direction, the suction air passage is formed by the space composed of the combination of the respective openings at the plurality of layers, the plurality of layers includes:

one layer having the opening to function as the first portion and the opening to function as the second portion;

the other layer having the opening to function as the third portion; and an intermediate layer located between the one layer and the other layer in the second direction, and forming communication between the first portion, the second portion, and the third portion, and the first partitioning section, the second partitioning section, and the third partitioning section are provided in the intermediate layer.

2. The inkjet recording apparatus according to claim 1, wherein the partitioning member is composed of a material to absorb the ink.

* * * * *